Sept. 8, 1925.
J. H. GELINAS
1,552,740
HOT DISH LIFTER
Filed June 11, 1924
2 Sheets-Sheet 1
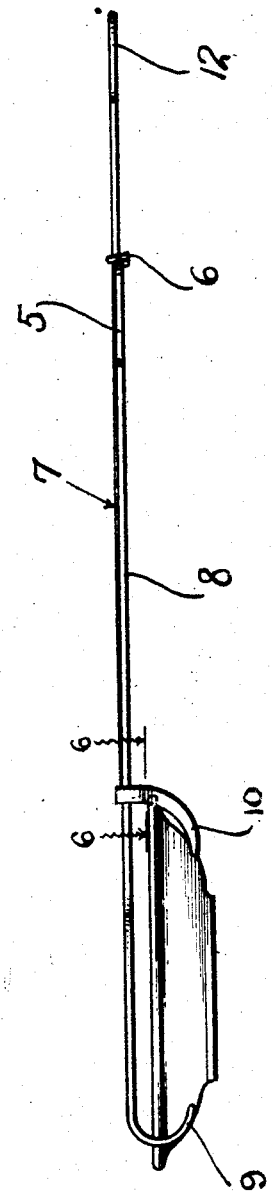
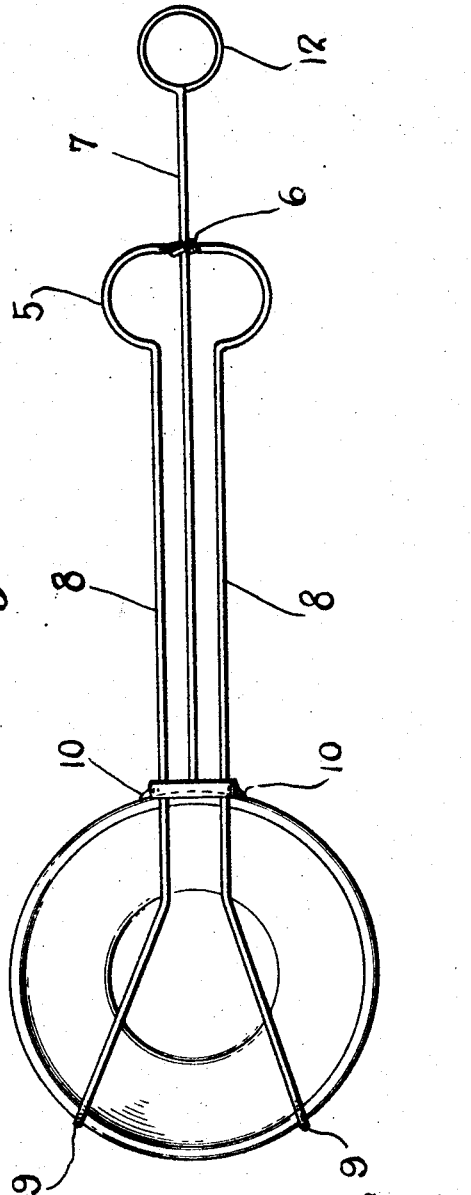
Inventor
Joseph H. Gelinas
By L. B. James
Attorney

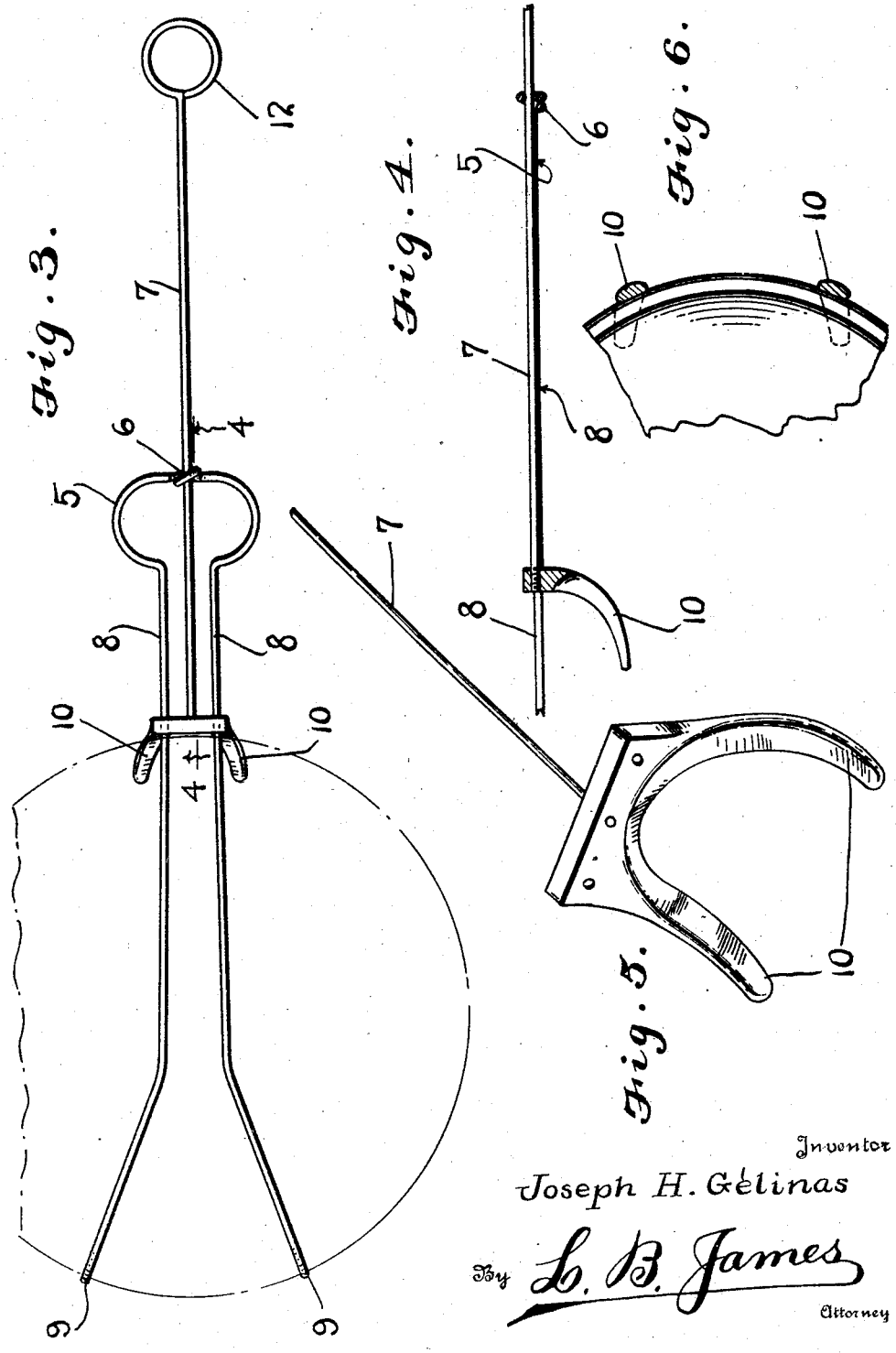

Patented Sept. 8, 1925.

1,552,740

UNITED STATES PATENT OFFICE.

JOSEPH H. GÉLINAS, OF DOVER, NEW HAMPSHIRE.

HOT-DISH LIFTER.

Application filed June 11, 1924. Serial No. 719,359.

*To all whom it may concern:*

Be it known that I, JOSEPH H. GÉLINAS, a citizen of the United States, residing at Dover, in the county of Strafford and State of New Hampshire, have invented new and useful Improvements in Hot-Dish Lifters, of which the following is a specification.

This invention relates to kitchen utensils and more particularly to dish lifters.

The primary object of this invention resides in the provision of a dish lifter adapted to be utilized for lifting hot dishes or pans from a stove.

Another object of this invention resides in the provision of a lifter fork, adapted to grasp dishes of different sizes.

A still further object of this invention resides in the provision of a lifter fork having grasping fingers adapted to engage the edges of dishes in such manner that lateral movement thereof will be avoided during the lifting of the dish.

Aside from the aforesaid objects, this invention resides in the provision of a lifter fork having stationary and adjustable fingers carried by correlated handles which, when grasped by an individual, will prevent the fingers from spreading and disengaging their grasp of the dish being lifted.

In addition to the foregoing objects, this invention resides in the provision of a dish lifter having a variable range of adjustments with its dish grasping fingers formed to accommodate the edges of dishes of different diameters.

Aside from the above-mentioned objects, this invention resides in the provision of a dish lifter consisting of an embodiment of co-operative elements so arranged that dishes of different sizes can easily be grasped and lifted with the use of but one hand.

With the above and other objects in view, this invention resides in certain novel features of construction, arrangement and combination of elements to be hereinafter set forth in the specification, illustrated in the accompanying drawings and pointed out in the appended claims and, while the present disclosure fully depicts my conception of this invention, the right is reserved to resort to such changes as come within the scope of the claims.

In the accompanying drawings:

Fig. 1 is a side view of a lifter fork constructed in accordance with my invention, the same being illustrated as grasping a plate.

Fig. 2 is a plan view thereof.

Fig. 3 is an enlarged plan view thereof showing the plate in dot-and-dash lines.

Fig. 4 is a longitudinal sectional view approximately on line 4—4 of Fig. 3.

Fig. 5 is a detail perspective view of the adjustable U-shaped member.

Fig. 6 is a detail sectional view approximately on line 6—6 of Fig. 1.

In the present embodiment of this invention the numeral 5 designates a substantially U-shaped handle having its medial portion looped upon itself to provide a guide bearing 6 for a circular slidable rod 7.

The aforesaid handle 5 has its extremities continued into elongated diverging arms 8 terminating into hook-shaped fingers 9, which are adapted to surround the flange of a dish, plate or pan at different points along their peripheries to prevent slippage of the dish when a substantially inverted U-shaped member 9' forming fingers 10, carried by the elongated arms 8, are forced against the opposite edge of the dish. The fingers 10 have their dish engaging surfaces 10' beveled inwardly and gradually tapered toward the base of the U-shaped member, so as to prevent the edges of dishes from sliding upwardly when the element 9' is pressed against the edges of the dishes.

The companion or slidable fingers are adapted to be manipulated backwardly and forwardly along the arms 8 by the rod 7 and are of such shape as to readily receive the flanges of dishes of different diameters. The rod 7 has its outer or free end provided with a loop or ring 12 which together with the handle 5 can be grasped by the fingers of an individual to manipulate the fingers 10 into and out of engagement with dishes or pans.

Through the provision of the diverging arms of the handle, the tendency thereof to spread will be prevented by the engagement thereof of the fingers 10 and as a certain degree of friction is thus established the fingers will be prevented from accidentally slipping from engagement with the dish.

With this invention fully set forth, it is manifest that a dish lifter is provided which is not only cheap of manufacture but means are provided to lift hot dishes from stoves with safety.

Having thus described my invention, what I claim and desire to protect by Letters Patent is:

1. A dish lifter of the character set forth comprising a handle, arms extending from the handle, fingers formed on the arms, a substantially inverted U-shaped member having an inwardly beveled dish engaging surface gradually tapering toward its medial point, and a rod slidably engaging the handle and connected to the U-shaped member.

2. A dish lifter of the character set forth comprising a handle, arms extending from the handle, fingers formed on the arms, a substantially inverted U-shaped member having a bevelled dish engaging surface directed forwardly and laterally outward from the base thereof, and a rod slidably engaging the handle and connected to the U-shaped member.

In testimony whereof I affix my signature.

JOSEPH H. GÉLINAS.